United States Patent
Delany et al.

(10) Patent No.: US 6,658,454 B1
(45) Date of Patent: Dec. 2, 2003

(54) ELECTRONIC MAIL SYSTEM WITH IMPROVED METHODOLOGY FOR PROCESSING MESSAGES WITH MAILING LISTS

(75) Inventors: Mark Delany, El Cerrito, CA (US); Murray Kucherawy, San Francisco, CA (US)

(73) Assignee: Sendmail, Inc., Emeryville, CA (US)

( * ) Notice: Subject to any disclaimer, the term of this patent is extended or adjusted under 35 U.S.C. 154(b) by 0 days.

(21) Appl. No.: 09/499,502

(22) Filed: Feb. 7, 2000

(51) Int. Cl.[7] .............................................. G06F 15/16
(52) U.S. Cl. ...................................... 709/202; 709/206
(58) Field of Search ................................ 709/204, 206, 709/207, 217, 218, 223, 200, 202; 345/752

(56) References Cited

U.S. PATENT DOCUMENTS

| | | | | |
|---|---|---|---|---|
| 5,424,724 A | * | 6/1995 | Williams et al. | |
| 5,864,684 A | * | 1/1999 | Nielsen | 709/206 |
| 5,892,909 A | * | 4/1999 | Grasso et al. | 709/203 |
| 5,920,697 A | * | 7/1999 | Masters et al. | 709/219 |
| 5,937,162 A | * | 8/1999 | Funk et al. | 709/206 |
| 5,970,491 A | * | 10/1999 | Schreiber et al. | 707/10 |
| 6,202,087 B1 | * | 3/2001 | Gadish | 709/206 |

OTHER PUBLICATIONS

Dierks, T. et al., RFC2246: The TLS Protocol—Version 1.0, Internet Engineering Task Force, Jan. 1999.
Hoffman, P., RFC2487: SMTP Service Extension for Secure SMTP over TLS, Internet Engineering Task Force, Jan. 1999.
Sendmail, Sendmail For NT: User Guide, Sendmail (Part No.: DOC–SMN–300–WNT–MAN–0999), 1999.
Crispin, M., RFC2061: IMAP4 Compatibility With IMAP2BIS, Internet Engineering Task Force, Dec. 1996.
Crispin, M., RFC2060: Internet Message Access Protocol—Version 4 (rev 1), Internet Engineering Task Force, Nov. 1996.

(List continued on next page.)

*Primary Examiner*—Marc D. Thompson
(74) *Attorney, Agent, or Firm*—John A. Smart

(57) ABSTRACT

An electronic mail ("e-mail") system providing improved methodology for processing messages sent to mailing lists is described. The system include an "Injector" component which serves to "inject" messages into one or more Message Transfer Agents (MTAs). The system's Mailing List Manager (MLM), acting through the Injector, posts the address to a first MTA. If that MTA successfully processes the address, it responds with a "success" result, which may be passed back through the Injector to the MLM. If, on the other hand, that MTA is not successful, then the address is passed off to a second MTA. Again, if that MTA is successful, it will indicate that success back to the MLM; otherwise, the address is then passed off to the next MTA. The foregoing sequence continues until either the address for the given recipient is successfully processed by one of the MTAs or all of the available MTAs have been exhausted. In the event that all of the available MTAs fail, the address is then ultimately passed on to a fallback MTA, which will indicate initial success and assume any responsibility for queuing the message for that recipient. Once all addresses have been assigned to exactly one MTA, fallback or otherwise, the body of the message is passed to the MTAs for delivery to the recipients assigned to each. By dividing work among available MTAs, the system of the present invention is able to achieve optimal distribution of workload for the system. In the event of a failure at one of the MTAs, that MTA's task may be instead distributed to the other remaining MTAs, that is, applying load balancing technique for handling an MTA failure.

36 Claims, 10 Drawing Sheets

OTHER PUBLICATIONS

Myers, J., RFC2033: Local Mail Transfer Protocol, Internet Engineering Task Force, Oct. 1996.

Myers, J., RFC1725: Post Office Protocol—Version 3, Internet Engineering Task Force, Nov. 1994.

Braden, R. (Editor), RFC1123: Requirements for Internet Hosts—Application and Support, Internet Engineering Task Force, Oct. 1989.

Rose, M., RFC1081: Post Office Protocol—Version 3, Internet Engineering Task Force, Nov. 1988.

Partridge, Craig, RFC974: Mail Routing and the Domain System, Internet Engineering Task Force, Jan. 1986.

Butler, M. et al., RFC937: Post Office Protocol—Version 2, Internet Engineering Task Force, Feb. 1985.

The Exim Mail Transfer Agen 3.1. http://www.exim.org/exim–html–3.10/doc/html/spec_toc.html. Nov. 22, 1999.* http://www.exim.org/pipemail/exim–users/Week–of–Mon–19990412/012024.html. [Exim] claification on use of LMTP.*

Crocker, David H., RFC822: Standard For The Format Of Arpa Internet Text Messages, Dept. of Electrical Engineering, University of Delaware, Aug. 1982.

Postel, Jonathan B., RFC821: Simple Mail Transfer Protocol, Information Sciences Institute, University of Southern California, Aug. 1982.

* cited by examiner

ELECTRONIC MAIL SYSTEM WITH IMPROVED METHODOLOGY FOR PROCESSING MESSAGES WITH MAILING LISTS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic mail (e-mail) systems and, more particularly, to improved methodology for processing an e-mail message sent to a predefined mailing list (specifying multiple recipients).

Today, electronic mail or "e-mail" is a pervasive, if not the most predominant, form of electronic communication. FIG. 1 illustrates the basic architecture of a typical electronic mail system. At a high level, the system includes a mail server connected over a network to various e-mail "clients," that is, the individual users of the system. More specifically, the system 10 includes one or more clients 11 connected over a network to at least one Message Transfer Agent (MTA) 12a. Communication occurs through a standardized protocol, such as SMTP (Simple Mail Transport Protocol) in the context of the Internet.

A typical e-mail delivery process is as follows. In the following scenario, Larry sends e-mail to Martha at her e-mail address: martha@example.org. Martha's Internet Service Provider (ISP) uses an MTA, such as provided by Sendmail® for NT, available from Sendmail, Inc. of Emeryville, Calif. (With a lower case "s," "sendmail" refers to Sendmail's MTA, which is one component of the Sendmail® for NT product.)

1. Larry composes the message and chooses Send in Microsoft Outlook Express (a "mail user agent" or MUA). The e-mail message itself specifies one or more intended recipients (i.e., destination e-mail addresses), a subject heading, and a message body; optionally, the message may specify accompanying attachments.
2. Microsoft Outlook Express queries a DNS server for the IP address of the host providing e-mail service for the destination address. The DNS server, which is a computer connected to the Internet running software that translates domain names, returns the IP address, 127.118.10.3, of the mail server for Martha's domain, example.org.
3. Microsoft Outlook Express opens an SMTP connection to the mail server running sendmail at Martha's ISP. The message is transmitted to the sendmail service using the SMTP protocol.
4. sendmail delivers Larry's message for Martha to the local delivery agent. It appends the message to Martha's mailbox. By default, the message is stored in: C:\Program Files\Sendmail\Spool\martha.
5. Martha has her computer dial into her ISP.
6. Martha chooses Check Mail in Eudora.
7. Eudora opens a POP3 (Post Office Protocol version 3, defined in RFC1725) connection with the POP3 (incoming mail) server. Eudora downloads Martha's new messages, including the message from Larry.
8. Martha reads Larry's message.

The MTA, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request For Comment documents (RFCs). Typically, the mail server or MTA must temporarily store incoming and outgoing messages in a queue, the "mail queue." Actual queue size is highly dependent on one's system resources and daily volumes.

MTAs, such as the commercially-available Sendmail® MTA, perform three key mail transport functions:
Routes mail across the Internet to a gateway of a different network or "domain" (since many domains can and do exist in a single network)
Relays mail to another MTA (e.g., 12b) on a different subnet within the same network
Transfers mail from one host or server to another on the same network subnet To perform these functions, it accepts messages from other MTAs or MUAs, parses addresses to identify recipients and domains, resolves aliases, fixes addressing problems, copies mail into a queue on its hard disk, tries to process long and hard-to-pass messages, and notifies the sender when a particular task cannot be successfully completed. The MTA does not store messages (apart from its queue) or help users access messages. It relies on other mail system components, such as message delivery agents, message stores and mail user agents (MUAs), to perform these tasks. These additional components can belong to any number of proprietary or shareware products (e.g., POP3 or IMAP servers, Microsoft Exchange, IBM Lotus Notes, Netscape, or cc:Mail servers, or the like). Because of its central role in the e-mail systems, however, the MTA often serves as the "glue" that makes everything appear to work together seamlessly.

For further description of e-mail systems, see e.g., Sendmail® for NT User Guide, Part Number DOC-SMN-300-WNT-MAN-0999, available from Sendmail, Inc. of Emeryville, Calif., the disclosure of which is hereby incorporated by reference. Further description of the basic architecture and operation of e-mail systems is available in the technical and trade literature; see e.g., the following RFC (Request For Comments) documents:

| | |
|---|---|
| RFC821 | Simple Mail Transfer Protocol (SMTP) |
| RFC822 | Standard for the Format of ARPA Internet Text Messages |
| RFC974 | Mail Routing and the Domain System |
| RFC1123 | Requirements for Internet Hosts -- Application and Support |
| RFC1725 | Post Office Protocol version 3 (POP3) |
| RFC2033 | Local Mail Transfer Protocol (LMTP) |
| RFC2060 | Internet Message Access Protocol (IMAP), Ver 4, rev. 1 | currently available via the Internet at the disclosures of which are hereby incorporated by reference. RFCs are numbered Internet informational documents and standards widely followed by commercial software and freeware in the Internet and UNIX communities. The RFCs are unusual in that they are floated by technical experts acting on their own initiative and reviewed by the Internet at large, rather than formally promulgated through an institution such as ANSI. For this reason, they remain known as RFCs even once they are adopted as standards.

Often when sending e-mail, a distribution or "mailing list" is employed to facilitate the process of sending an e-mail message to a group of people. For instance, instead of addressing an e-mail message to individual members of a recurring group, a user can instead simply define a mailing list to comprise those members. For example, the user could define a "Marketing" mailing list that specifies members of the marketing department of the user's company. Once defined, the mailing list can be used in the recipient field for an e-mail message, in lieu of listing individual members. A message sent to this distribution list goes to all recipients listed. Typically, e-mail systems provide graphical user interface facilities for managing (e.g., adding and deleting) names in a mailing list.

Expectedly, as a particular list grows larger, it becomes progressively more resource intensive and time consuming to manage and process. Although the foregoing example of a mailing list for a marketing department may comprise a comparatively small group of recipients (e.g., less than 100), a mailing list can in fact specify an extremely large group of recipients. Consider, for instance, a mailing list defined for customer support (e.g., "North American Users") for a large software company. As another example, ISPs (Internet Service Providers) typically support many domains, many lists within each domain, and many users for each list. In such a case, a given mailing list may in fact specify many thousands or even millions of recipients, leading to an incredible amount of mailing list traffic. Accordingly, there is great interest in improving the management and processing of mailing lists so that e-mail sent to mailing lists, particularly large ones, are processed in an efficient manner.

In an electronic mail system, the task of processing a mailing list usually falls to a Mailing List Manager or "MLM", such as MLM 13 for the e-mail system for FIG. 1. Upon receiving an e-mail message sent to a predefined mailing list, the system's MTA hands off the message, with the name of the list, to the system's MLM. After checking the message, the MLM enumerates the individual recipients for the list and hands the message with a list of the specific intended recipients (i.e., with the names/e-mail addresses of the specific intended recipients attached) back to the MTA for redistribution. For instance, if the message had a mailing list specifying 100 recipients, the MLM would, after finishing its work, post the message back to the MTA with each of the 100 recipients specified. Here, the MLM opens a connection (e.g., "pipe" in UNIX—a direct data feed) to the MTA. The MTA is responsible for queuing up the message and arranging for its distribution to all of the various recipients.

Without further enhancement to this basic process of handling an e-mail message with a large mailing list, the MLM is handing a substantial amount of work to the MTA to do, with no real intelligence. For instance, for a message sent to a predefined mailing list of 1000 recipients, the MLM is handing to the MTA a list of 1000 tasks to do in sequence—that is, 1000 messages to queue and distribute. At the same time, MTAs tend not to be very good at parallel delivery of a single message. Therefore, the approach commonly employed by MTAs is to do the tasks in series, one at a time. However, that approach incurs the penalty of increased delivery time. Accordingly, there is much interest in increasing the speed of message delivery by the MTA, so that total delivery time for messages is decreased. To date, existing systems have failed to adequately address this problem and, as a result, system performance in such a scenario is poor.

One approach, such as was attempted by another MLM called "Listmanager," is to take the message and break it into multiple copies of the same message each with a subset of the main recipient list—that is, the set of recipients is divided into "n" roughly equal pieces, and each such piece gets a copy of the entire message being distributed. Although this offers some degree of improvement in parallelism of delivery, it also takes up more disk space as "n" copies of a (possibly large) message are placed into the queue. As "n" increases, delivery parallelism improves but increasing resource consumption causes the overall performance to degrade. The balance can be quite delicate, if not perilous. Listmanager is also somewhat bound to using the Sendmail® open source MTA, thereby limiting user choice in selecting which vendor's MTA and MLM best serve the needs of a given environment. Accordingly, a better solution is desirable.

SUMMARY OF THE INVENTION

An electronic mail ("e-mail") system includes one or more clients connected over a network to at least one Message Transfer Agent (MTA), that is, the program responsible for delivering e-mail messages. Upon receiving a message from a Mail User Agent or another MTA it stores it temporarily locally and analyses the recipients and either delivers it (local addressee) or forwards it to another MTA (routing). Communication occurs through a standardized protocol, such as SMTP (Simple Mail Transport Protocol) in the context of the Internet. Often when sending e-mail, a distribution or "mailing list" is employed to facilitate the process of sending an e-mail message to a group of people. For instance, instead of addressing an e-mail message to individual members of a recurring group, a user can instead simply define a mailing list to comprise those members. Upon receiving an e-mail message sent to a predefined mailing list, the system's MTA hands off the message, with the name of the list, to the system's Mailing List Manager or MLM. After checking the message (e.g., privacy checking and verification that the message is legitimate for distribution), the MLM enumerates the individual recipients for the list and hands the message with a list of the specific intended recipients (i.e., with the names/e-mail addresses of the specific intended recipients attached) back to the MTA for redistribution. In this fashion, a mailing list can be used in the recipient field for an e-mail message, in lieu of listing individual members, so that a message sent to this distribution list goes to all recipients listed. However, as a particular mailing list grows larger, it becomes progressively more resource-intensive and time-consuming task to manage and process.

An electronic mail system of the present invention includes methodology for processing messages sent to mailing lists, particularly large ones, in an efficient manner. The solution of the present invention is to include an "Injector" component. Here, an electronic mail system constructed in accordance with the present invention includes an MLM connected to an MTA through an Injector. At a high level, the purpose of the Injector is to inject messages into the MTA, or multiple MTAs.

For a given mailing list, the system processes each recipient address as follows. The MLM, acting through the Injector, posts the address to a first MTA. If that MTA successfully processes the address, it responds with a "success" result, which may be passed back through the Injector to the MLM. If, on the other hand, that MTA is not successful, then the address is passed off to a second MTA. Again, if that MTA is successful, it will indicate that success back to the MLM; otherwise, the address is then passed off to the next MTA. At this point, the Injector tries to assign each address to an available MTA before the body of the message goes anywhere. In other words, the Injector attempts to find a "home" for each address. Only after all addresses have been assigned to an outgoing MTA does the actual message data get handed off.

The foregoing sequence continues until either the address for the given recipient is successfully processed by one of the MTAs or all of the available MTAs have been exhausted. In the event that all of the available MTAs fail, the address is then ultimately passed on to the fallback MTA, which will indicate initial success and assume any responsibility for queuing the message for that recipient. From the perspective of the MLM, therefore, each recipient of the mailing list has been successfully handled. In an exemplary configuration, each of the remote or external MTAs would reside on relatively powerful server machines. Since the fallback MTA is configured to never reject an address, all addresses should initially be processed by the available remote MTAs, until those MTAs are exhausted. In that manner, the fallback MTA is reserved for only those addresses rejected by all of the remote MTAs. Once all addresses have been assigned to exactly one MTA, fallback or otherwise, the body of the message is passed to the MTAs for delivery to the recipients assigned to each.

During system operation, the remote MTAs and fallback MTA are specified by a configuration file for the Injector. Before performing address distribution, the Injector attempts to establish a connection with each of the remote MTAs. Any MTA that is down can be immediately detected by the Injector as that MTA will be unable to establish a connection. In such a case, the Injector adjusts the address distribution so that it is spread among the remaining MTAs (i.e., those able to successfully establish a connection). The underlying design provided by the present invention affords flexibility to incorporate any combination of internal and/or external MTAs, as desired by a system administrator for a given deployment.

By dividing work among available MTAs, the system of the present invention is able to achieve optimal distribution of workload for the system. In the event of a failure at one of the MTAs, that MTA's task may be instead distributed to the other remaining MTAs, that is, applying load balancing technique for handling an MTA failure. Further, since the Injector decouples the MLM from the MTA, the MLM can be ignorant of the interface for the MTA, thus allowing the MLM to remain constant.

DETAILED DESCRIPTION OF A PREFERRED EMBODIMENT

The following description will focus on the presently-preferred embodiment of the present invention, which is implemented in a server-side application operating in an Internet-connected environment running under a network operating system, such as the Microsoft® Windows 2000 running on an IBM-compatible PC. The present invention, however, is not limited to any particular one application or any particular environment.

Instead, those skilled in the art will find that the system and methods of the present invention may be advantageously embodied on a variety of different platforms, including Linux, BeOS, Solaris, UNIX, NextStep, and the like. Therefore, the description of the exemplary embodiments which follows is for purposes of illustration and not limitation.

Computer-based Implementation

A. Basic System Hardware (e.g., for Desktop and Server Computers)

Figure 1:
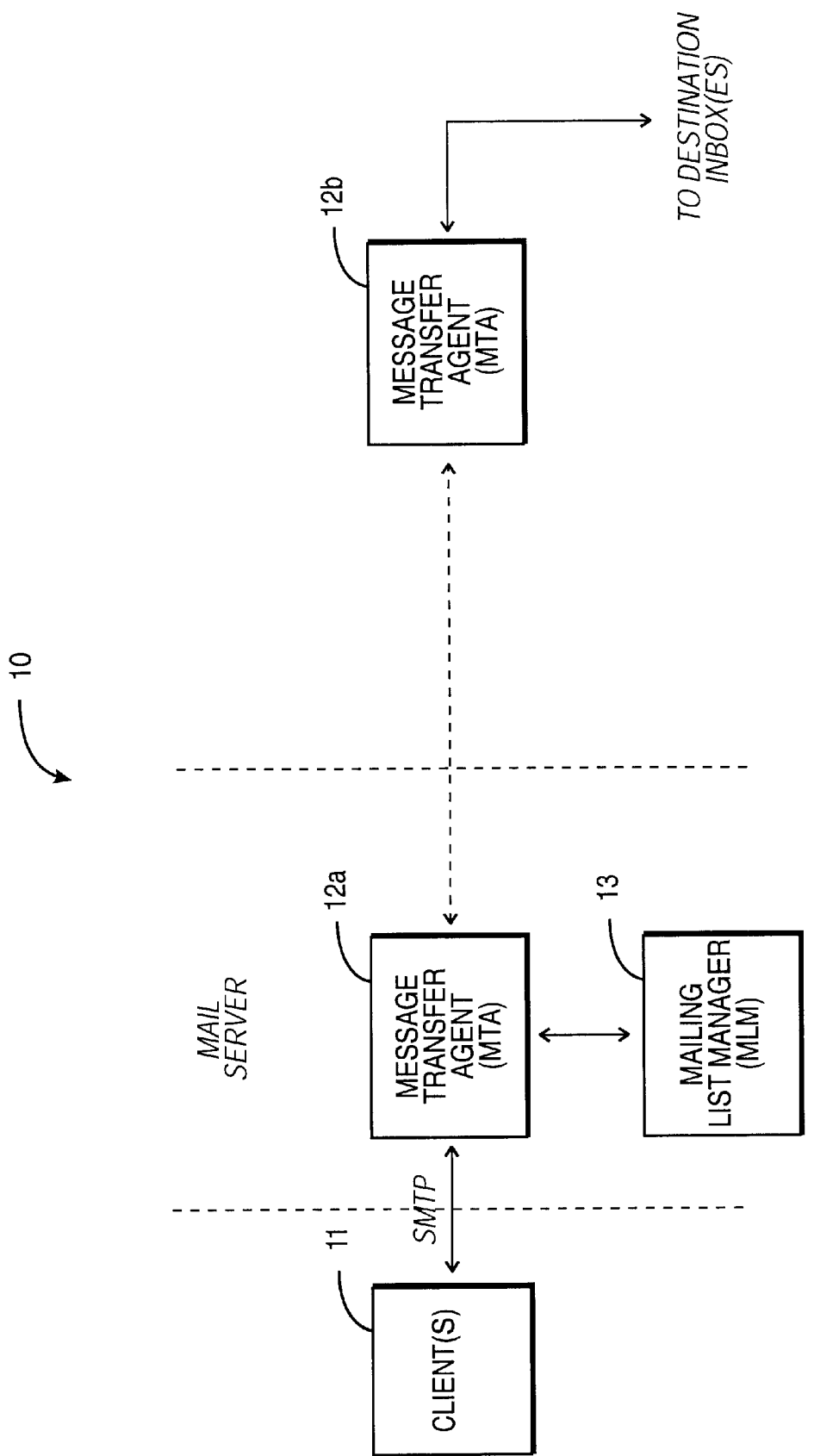
FIG. 1 is a block diagram illustrating the basic architecture of a typical electronic mail system.
Figure 2:
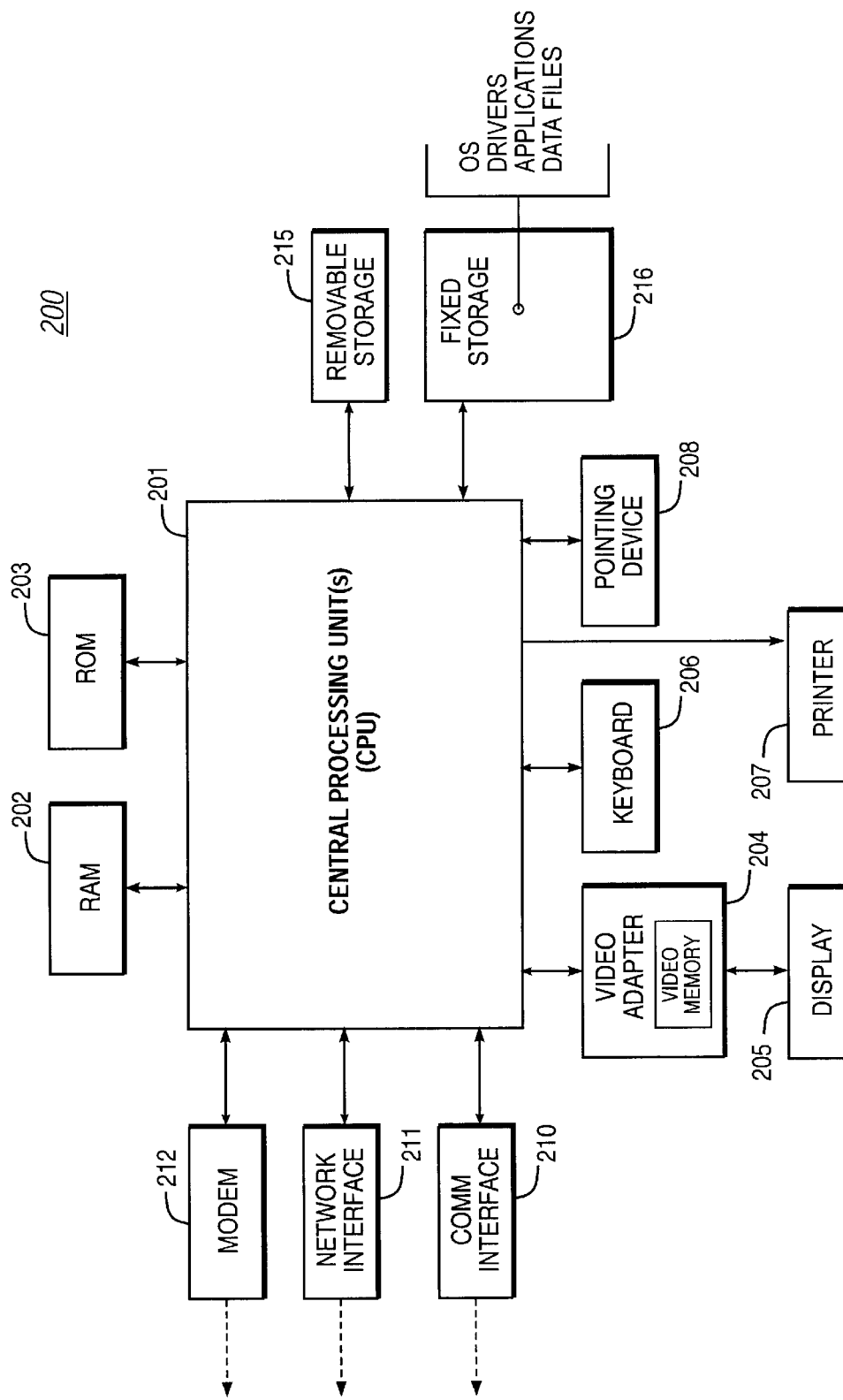
FIG. 2 is a block diagram illustrating a basic computer system suitable for implementing desktop (e.g., e-mail client) and server (e.g., mail server) components of the electronic mail system of the present invention.

The present invention may be implemented on a conventional or general-purpose computer system, such as an IBM-compatible personal computer (PC) or server computer. FIG. 2 is a very general block diagram of an IBM-compatible system 200. As shown, system 200 comprises a central processor unit(s) (CPU) 201 coupled to a random-access memory (RAM) 202, a read-only memory (ROM) 203, a keyboard 206, a pointing device 208, a display or video adapter 204 connected to a display device 205, a removable (mass) storage device 215 (e.g., floppy disk), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bidirectional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixteen megabytes or more is employed. More or less memory may be used without departing from the scope of the present invention. The read-only memory (ROM) 203 contains the basic input output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the storage device or mass storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based based input or data, and selection and manipulation of individual data objects displayed on the display screen 205. Likewise, the pointing device 208, such as a mouse, track ball, pen device, or the like, permits selection and manipulation of objects on the display screen. In this manner, these input devices support manual user input for any process running on the system.

The computer system displays text and/or graphic images and other data on the display device 205. Display device 205 is driven by the video adapter 204, which is interposed between the display 205 and the system. The video adapter 204, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include a RS-232 serial port, a Universal Serial Bus (USB) interface, or the like. Devices that will be commonly connected locally to the comm interface 210 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Sun Solaris workstations, which are available from Sun Microsystems of Mountain View, Calif.

The above-described system 200 of FIG. 2 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having services and/or information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 3:
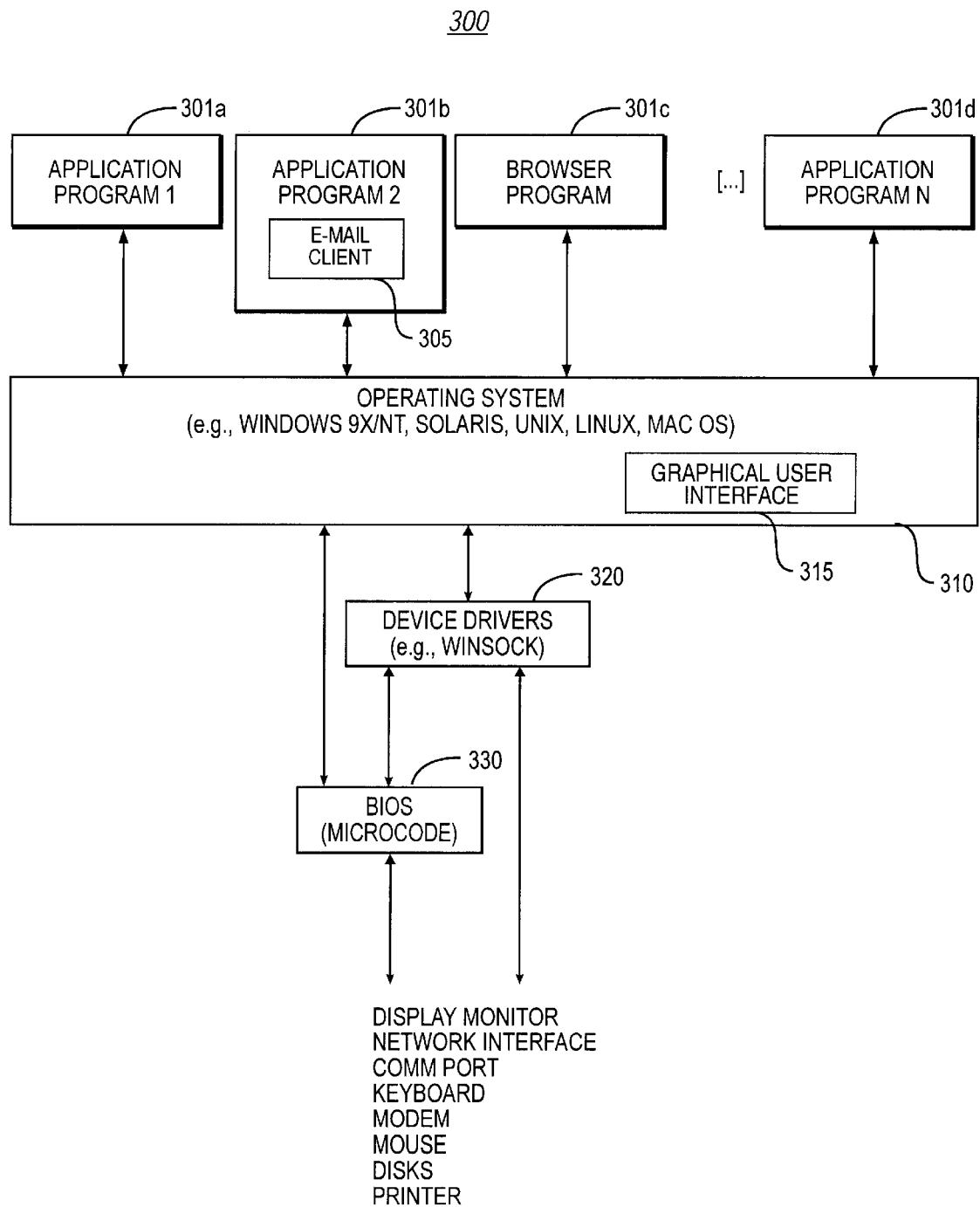
FIG. 3 is a block diagram of a basic software/firmware system suitable for controlling operation of the computer system of FIG. 2.

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c) may be "loaded" (i.e., transferred from fixed storage 216 into memory 202) for execution by the software system 200. For instance, when the system 200 is employed to control a desktop machine, application software 301 includes client e-mail software 305 (e.g., Microsoft Outlook, available from Microsoft Corporation of Redmond, Wash.), as shown. When the system 200 is employed to control a server machine, on the other hand, application software 301 includes mail server software (e.g., Sendmail® for NT). System 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver) and the system BIOS microcode 330 (i.e., ROM-based microcode), particularly when interfacing with peripheral devices. OS 310 can be provided by a conventional operating system, such as Microsoft® Windows 9x, by Microsoft® Windows NT, or by Microsoft® Windows 2000, all available from Microsoft Corporation of Redmond, Wash. Alternatively, OS 310 can also be an alterative operating system, such as IBM OS/2 (available from IBM of Armonk, N.Y.) or Linux OS (available from several vendors, including the Red Hat distribution of Linux from Red Hat, Inc. of Durham, N.C.).

Improved Processing Messages With Mailing Lists

A. General Design

Traditionally, the communication from the MLM to the MTA occurs through interprocess communication technique, such as a UNIX "pipe"; other examples of interprocess communication technique include shared memory (e.g., "clipboard"), dynamic data exchange (DDE), object linking and embedding (OLE), common object request (COM) model, and common object request broker (CORBA). Here, the MLM invokes another instance of the MTA and connects to it via a pipeline, a pathway for data to move between processes (on the same machine). When invoking the MTA, the MLM passes the entire message with a set of options (i.e., passes a list of parameters). The set of options either contains the recipients or references to all of the recipients. Although the foregoing is the approach traditionally employed, there is no particular need to follow that approach. Instead, various standard protocols exist that may be employed instead. For example, on a TCP/IP-based network, the MLM could connect to the MTA using SMTP communication protocol. However, that approach is less than desirable. In particular, the MTA, which is designed to guarantee delivery, may in fact reject a given address on the list. The address may later come on line, though. Thus one of the components, either the MLM or MTA, must take responsibility for that delivery. It is desirable to not burden the MLM with an entire queuing system, however, as that work is more appropriately handled by the MTA.

Figure 4A:
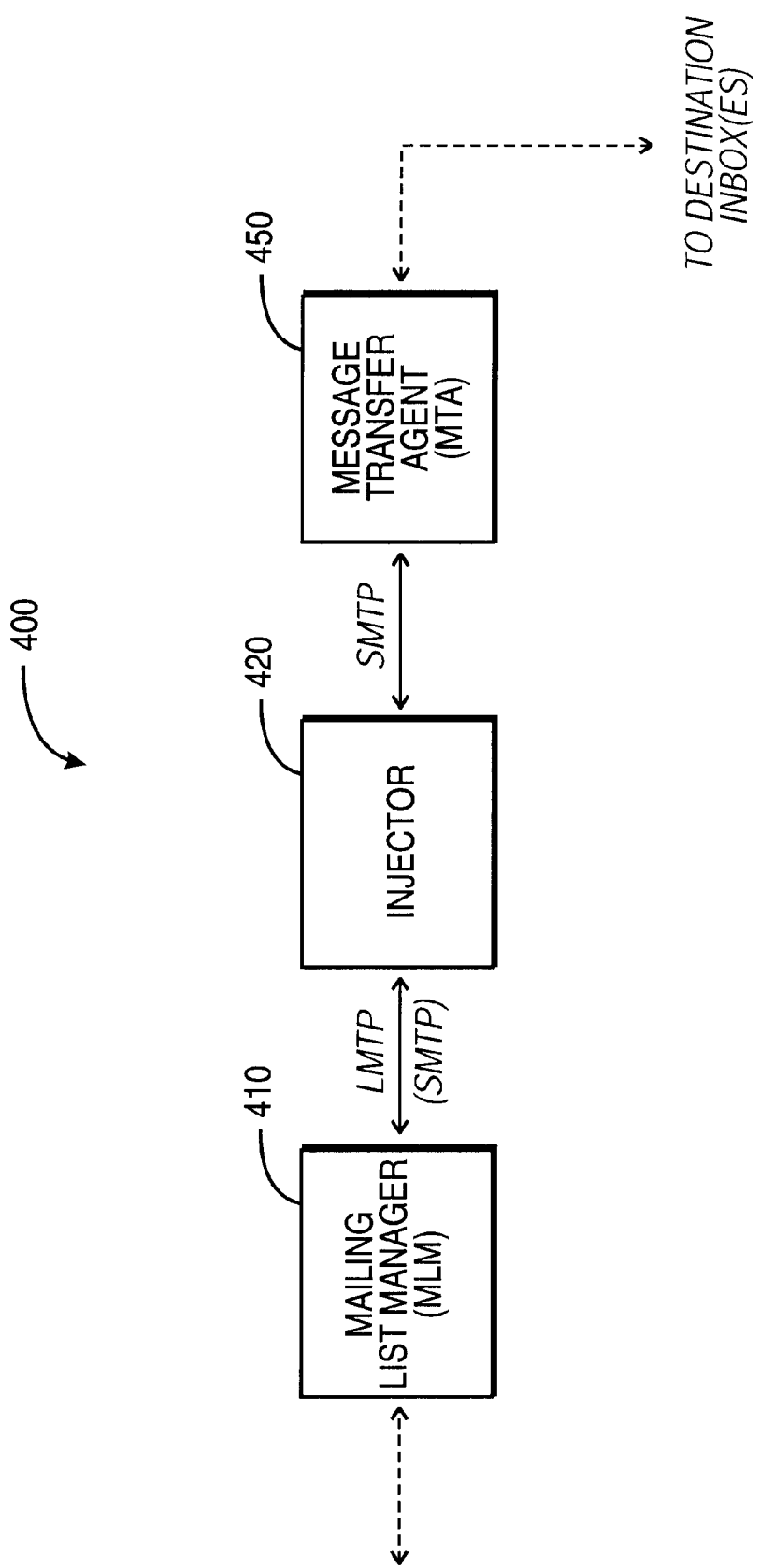
FIG. 4A is a block diagram illustrating the relationship among MLM, MTA, and Injector components, in the system of the present invention.

The solution of the present invention is to include an "Injector" component. As shown in FIG. 4A, an electronic mail system 400 of the present invention includes an MLM 410 connected to an MTA 450 through an Injector 420. At a high level, the purpose of the Injector 420 is to inject messages into the MTA 450, or multiple MTAs. Since the Injector 420 decouples the MLM 410 from the MTA 450, the MLM 410 can be ignorant of the interface for the MTA 450. Therefore, for instance, if the MTA is changed (i.e., to that of another vendor), the Injector need only be changed; the MLM remains constant. Communication between the MLM 410 and the Injector 420 occurs, in a preferred embodiment, using a simplified version of SMTP—LMTP (Local Mail Transport Protocol, defined in RFC 2033)—since the Injector need not support the full range of functionality addressed by SMTP. Employing this approach, the MLM 410 uses an LMTP pipe to pass the message to the Injector 420. The Injector 420, in turn, ultimately passes the message to an MTA (e.g., MTA 450), but may do so in any manner which preserves the independence between the MLM and the target MTA. With this architecture, the MLM is no longer concerned with the issue of mailing list performance, which is instead pushed downstream to the Injector/MTA. Further, the MLM is independent of the type or brand of MTA, thus allowing one the flexibility to mix MLM and MTAs. Also, the interface between the MLM and the Injector is defined and external, thus simplifying the task of interfacing an MLM with an Injector.

A problem still remains to be addressed: how to handle an address rejected by the target MTA, particularly in the case of transient failures. For a permanent failure (e.g., user unknown), the recipient may simply be taken off the mailing list. For a transient failure (e.g., destination mail server temporarily out of disk space), however, one of the components of the system must assume responsibility for requeuing the message. Therefore, in a preferred embodiment, the Injector 420 assumes responsibility for ensuring that the MLM need not worry about a transient failure, so that the MLM need not worry about requeuing messages.

Figure 4B:
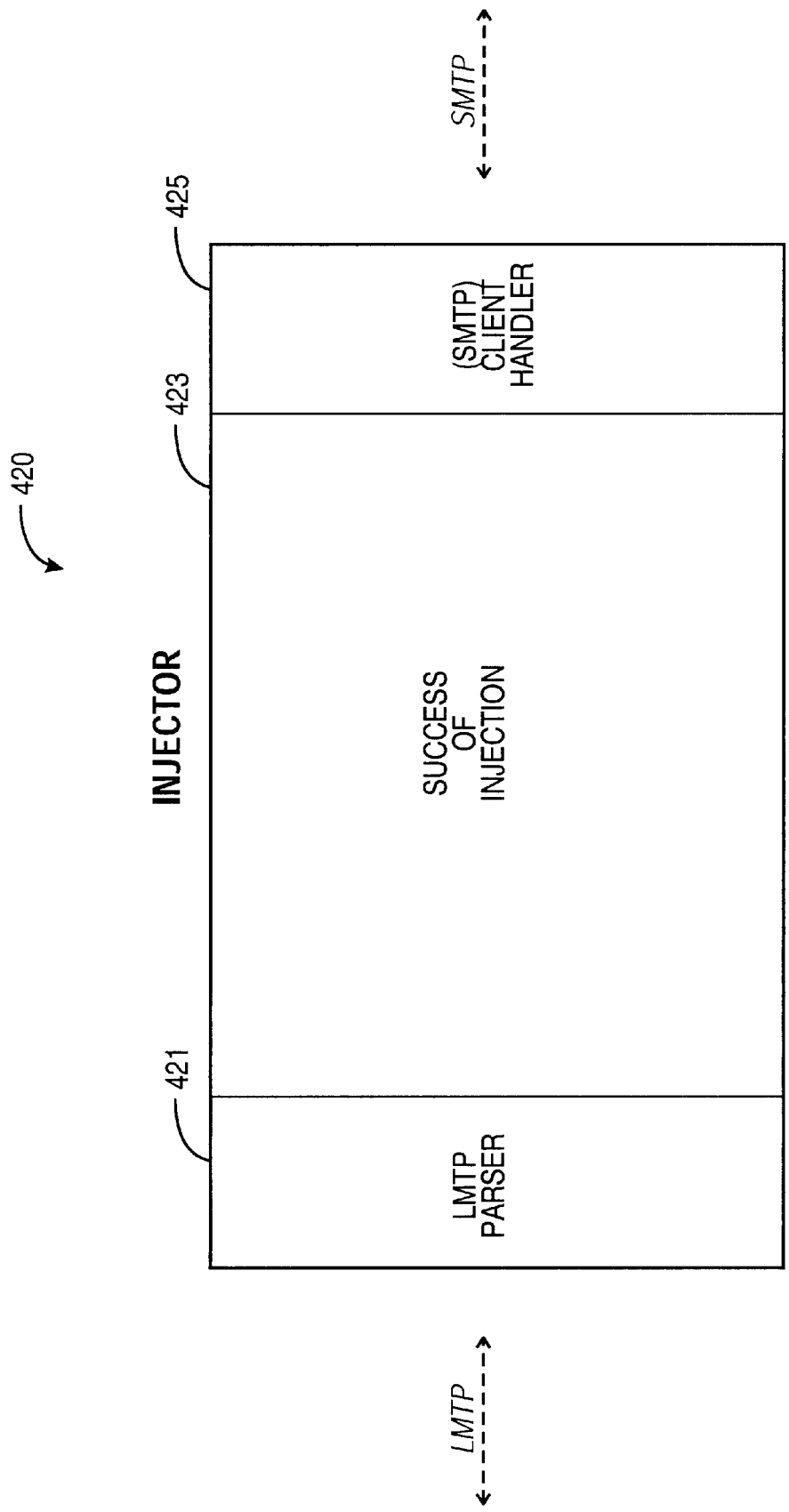
FIG. 4B is a block diagram illustrating the Injector component in greater detail.

FIG. 4B provides a high-level view of the Injector 420 itself, which emphasizes this approach. As shown on its left-hand side, the Injector 420 receives incoming LMTP information. Accordingly, the Injector 420 includes an LMTP Parser 421 for parsing the individual LMTP statements. A typical sequence from the MTA to the Injector is as follows, abstracted to a very high level.

| Command | Comment |
| --- | --- |
| LHLO | Hello statement, initializing communication session |
| MAIL FROM | Statement indicating who sent the message originally (i.e., who was the client) |
| RCPT TO | Sequence of statements indicating who are the recipients (i.e., n RCPT TO statements for n recipients) |
| < other recipients > | |
| DATA | Statement indicating that message body is to follow |

-continued

| Command | Comment |
| --- | --- |
| < message body > | Transmission of message body data |
| 250 | Success code |
| QUIT | Terminate session |

The LMTP Parser 421 may be constructed in a conventional manner; see e.g., the LMTP parser included in the open source release of Sendmail®, currently available via ftp at sendmail.org, the disclosure of which is hereby incorporated by reference. Ultimately, the Parser 421 builds an array of addresses, corresponding to those addresses on the target mailing list, and places the message body in its own block of memory. On its right-hand side, the Injector 420 includes a Client Handler 425 for feeding information to one or more MTAs for distribution. For this purpose, the Injector 420 employs SMTP protocol, which allows the Injector to communicate with remote MTAs (i.e., those not residing on the same machine as the Injector). Again, communication between components occurs using a known protocol, SMTP, thereby simplifying the task of interfacing the components together.

Recall that the Injector preferably cannot return an error code to the MLM (so that the MLM does not have to requeue the message). This functionality of the Injector is indicated by the Success of Injection component 423. This MTA-specific component of the Injector makes sure that there is, in effect, a successful initial delivery attempt on every address, so that the Injector does not return an error to the MLM. A property of MTAs makes it permissible to return a result indicating that an address was successful, even though in the end the address was not. With that approach, the entire distribution is passed to the MTA which decides, applying its own queuing methods, when to generate a "bounce" for a particular recipient (rather than returning an error initially). The Success of Injection component 423 assumes responsibility for making sure that its corresponding MTA responds in this manner, so that the MLM never receives an error for the initial injection of the message. This approach guarantees decoupling of the MLM and MTA. If the Injector needs to implement queuing, the Injector may do so in a manner that is independent of the MLM.

B. Parallel Address Distribution

Figure 5:
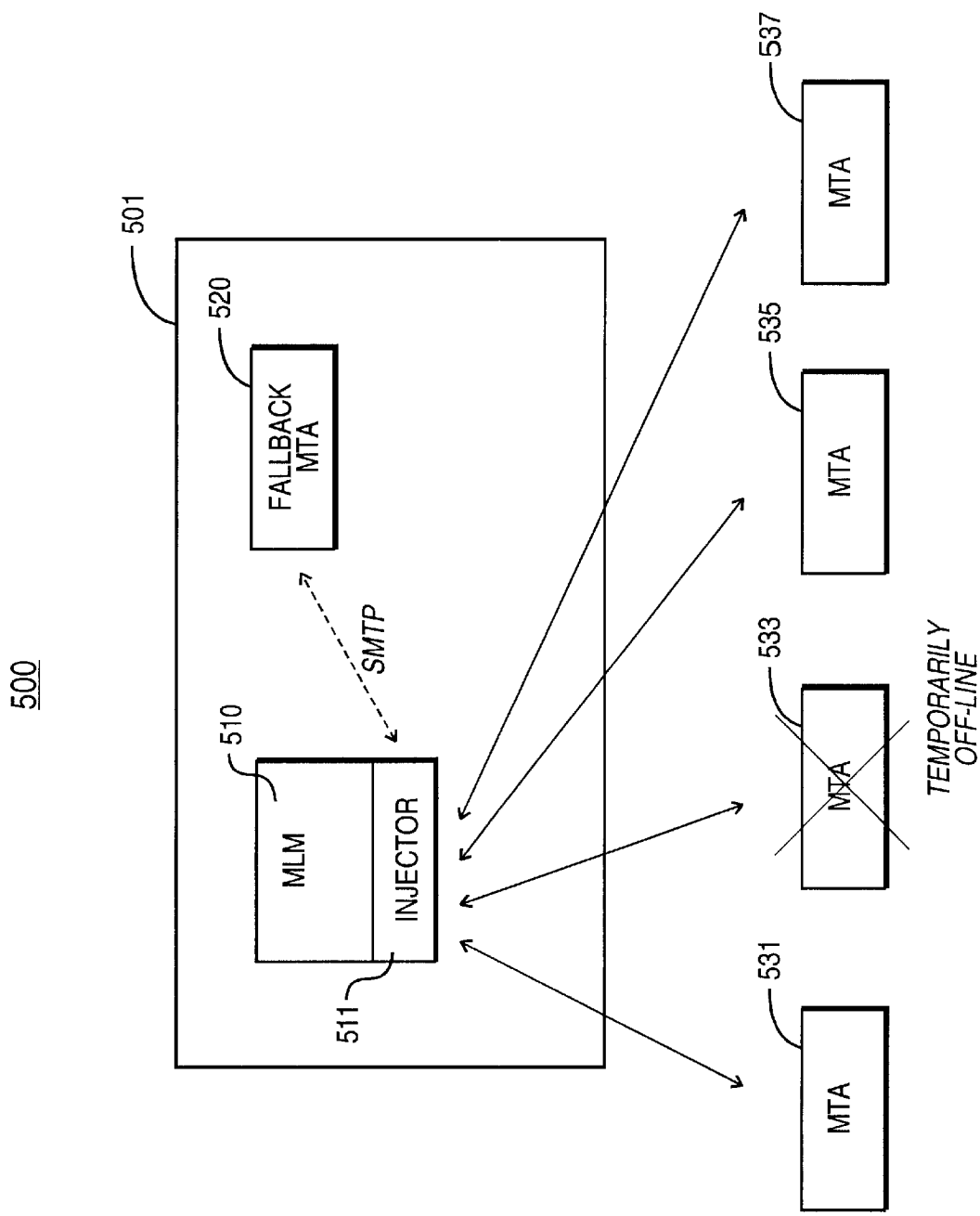
FIG. 5 is a block diagram illustrating sample topology employed when deploying the electronic mail system of the present invention.

The methodology of the present invention for processing messages sent to predefined mailing lists incorporates parallel processing features. Recall from above that it is not an optimal use of a parallel operating system to have one job or task with 1000 things to do, nor is it optimal to adopt the other extreme of breaking up the distribution into 1000 separate tasks. In accordance with the present invention, parallelism is achieved by processing the distribution with multiple MTAs. As illustrated in FIG. 5, e-mail topology 500 includes an e-mail system 501 having an MLM 510 which communicates with multiple MTAs through an Injector 511, for instance, using SMTP protocol. For example as shown, the MLM 510 may communicate with MTAs 531, 533, 535, 537, which may reside locally (i.e., on the same machine as the MLM) and/or remotely (as illustrated). For the example of an e-mail message with a mailing list specifying 1000 recipients, the work may be divided up evenly among the MTAs, such as each MTA receiving the task of distributing to one-quarter (i.e., 250) of the recipients (i.e., number of recipients divided by number of available MTAs). However in the event of a failure at one of the MTAs (e.g., MTA 533), that MTA's task may be instead distributed to the other remaining MTAs, that is, applying load balancing technique for handling an MTA failure.

It still may be the case that a given address is returned invalid on all MTAs. For example, the remote domain (destination) may be down, so that the system 501 is unable to obtain the name service for it. Since the possibility of a failure exists, it is desirable to include a fallback mechanism—a "fallback" MTA. In a preferred embodiment, the system 501 includes a local fallback MTA 520, which is configured to never reject an address. Since the MTA 520 resides locally in a preferred embodiment, it may be invoked directly, for instance, using interprocess communication (e.g., UNIX "pipe"). If desired, however, communication may be effected using another communication protocol, such as SMTP (see e.g., the above-mentioned Open Source Sendmail®). The MTA 520 always accepts a message for a given address and queues it up for distribution, thereby allowing it to indicate an initial "success" result. If an error later occurs in the distribution of that message (e.g., the message cannot be delivered to that recipient), the MTA 520 generates a "bounce" message for the MLM 510.

For a given recipient's address/message, the high-level approach may be summarized as follows. The MLM 510, acting through the Injector 511, posts the address to a first MTA, such as MTA 531. If that MTA successfully processes the address, it responds with a "success" result, which may be passed back through the Injector to the MLM. If, on the other hand, that MTA is not successful, then the address is passed off to a second MTA. Again, if that MTA is successful, it will indicate that success back to the MLM; otherwise, the address is then passed off to the next MTA. At this point, the Injector tries to assign each address to an available MTA before the body of the message goes anywhere. In other words, the Injector attempts to find a "home" for each address. Only after all addresses have been assigned to an outgoing MTA does the actual message data get handed off.

The foregoing sequence continues until either the address for the given recipient is successfully processed by one of the MTAs or all of the available MTAs have been exhausted. In the event that all of the available MTAs fail, the address is then ultimately passed on to the fallback MTA 520, which will indicate initial success and assume any responsibility for queuing the message for that recipient. From the perspective of the MLM, therefore, each recipient of the mailing list has been successfully handled. In an exemplary configuration, each of the remote or external MTAs would reside on relatively powerful server machines. Since the fallback MTA is configured to never reject an address, all addresses should initially be processed by the available remote MTAs, until those MTAs are exhausted. In that manner, the fallback MTA is reserved for only those addresses rejected by all of the remote MTAs. Once all addresses have been assigned to exactly one MTA, fallback or otherwise, the body of the message is passed to the MTAs for delivery to the recipients assigned to each.

During system operation, the remote MTAs and fallback MTA are specified by a configuration file for the Injector. Before performing address distribution, the Injector attempts to establish a connection with each of the remote MTAs. Any MTA that is down can be immediately detected by the Injector as that MTA will be unable to establish a connection. In such a case, the Injector adjusts the address distribution so that it is spread among the remaining MTAs (i.e., those able to successfully establish a connection). Those skilled in the art will appreciate that the non-fallback MTAs need not be remote. Instead, some or all of the non-fallback MTAs may be local (i.e., on the same machine as the MLM), including multiple instances of the same MTA program, for instance, invoked on the same machine using local interprocess communication (e.g., "pipe"). The design of the e-mail topology 500 provides flexibility to incorporate any combination of internal and/or external MTAs, as desired by a system administrator for a given deployment.

Internal Operation

A. Detailed Implementation of Methodology

Figure 6A:
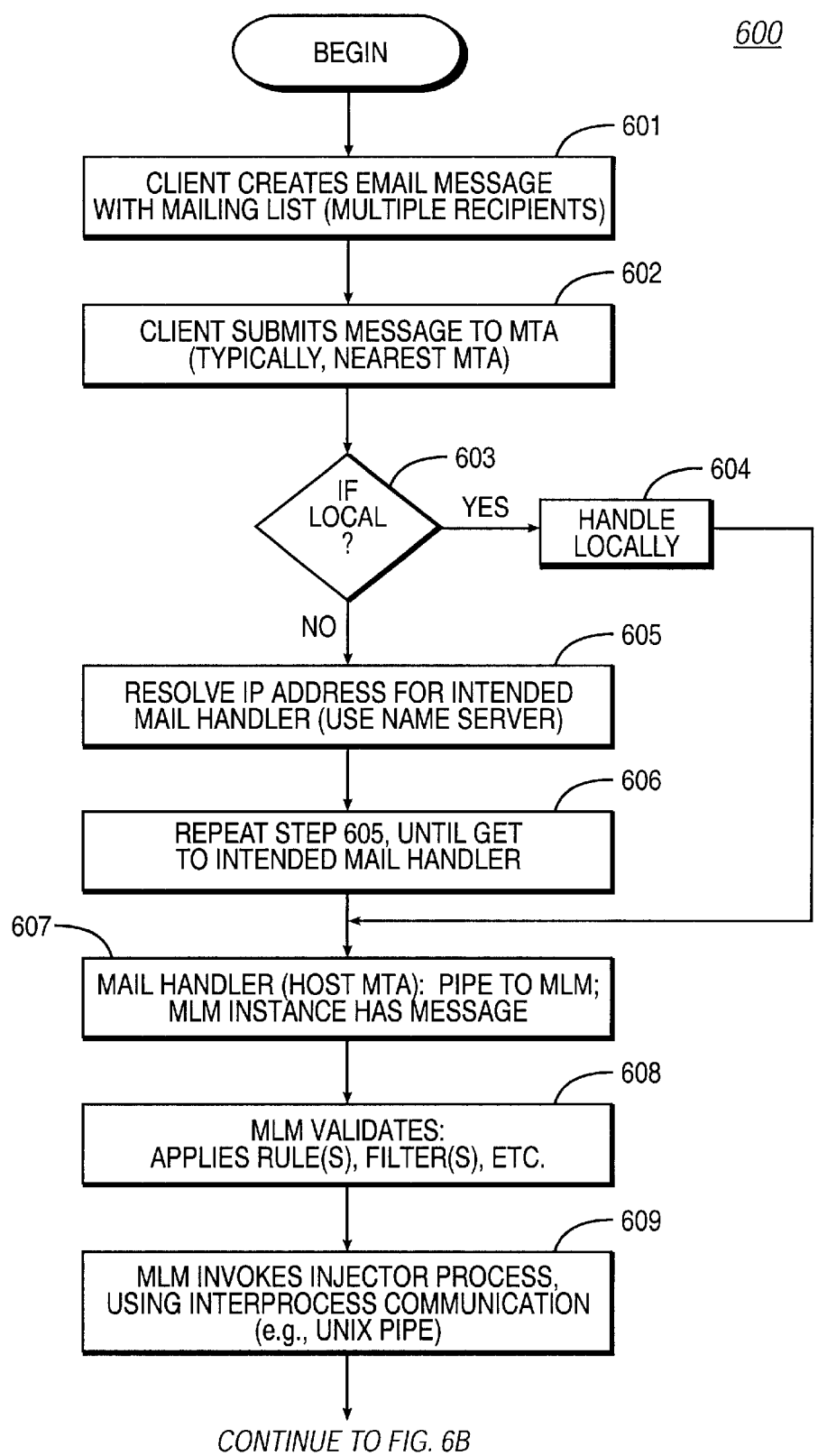
FIGS. 6A–B comprise a flowchart summarizing the overall methodology of the present invention for processing e-mail messages sent to predefined mailing lists.
Figure 6B:
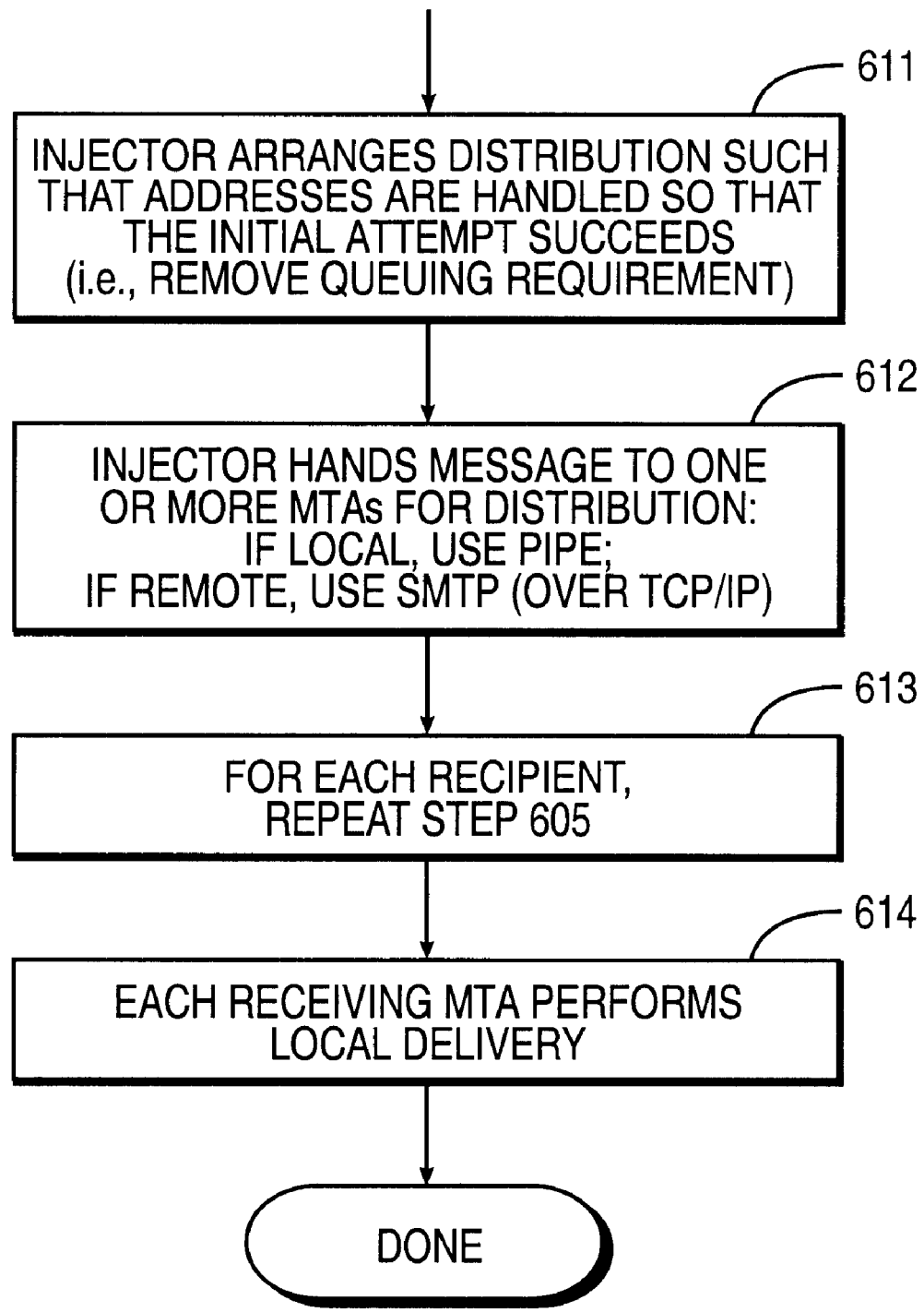

FIGS. 6A–B summarize implementation of the overall methodology of the present invention for processing e-mail messages sent to mailing lists. At step 601, a client (e.g., user), using client e-mail software (e.g., Eudora, Microsoft Outlook, or the like), creates an e-mail message or "submission" that the client wants sent to a mailing list—a potentially large number of intended recipients that are addressed through one single e-mail (mailing list) address. As indicated by step 602, the client submits the just-created e-mail message for distribution, for example, when the user clicks a "Send" command in the e-mail client software. In the background, the client e-mail software communicates over a network via SMTP with a MTA, typically the nearest one. The particular MTA employed is specified by the client set up; for example, in Microsoft Outlook, the user specifies an "outgoing mail server."

Upon receiving the message, the MTA figures out how to get the message to its intended mail handler (i.e., the MTA hosting the MLM), which may be the same MTA or a different one. Therefore, if the message is for distribution locally (i.e., the destination address is one actually already handled by the MTA), tested at step 603, the method proceeds to step 604 to handle the message locally (i.e., without name server resolution). Otherwise, the MTA determines the intended handler for the address, by using a name server-based mail routing, as indicated by step 605. Typically, a primary mail handler (i.e., mail handler for that domain) and a series of (backup) alternates are specified. Thus, the name server furnishes an IP address for the intended mail handler or one of the alternates. Mail routing and name resolution is described by RFC 974 (Mail Routing and the Domain System), the disclosure of which is hereby incorporated by reference. As shown in step 606, step 605 repeats (iteratively) so that the message is routed through a series of one or more MTAs until it reaches the intended mail handler, the host MTA that will communicate with the MLM. At step 607, the host MTA creates a child process that invokes the MLM (e.g., through a UNIX "pipe") with the message that the client generated. The MLM, upon receipt of this data, now has the same entire set of message data that the host MTA had. As indicated by step 608, it can now validate, filter, or otherwise process the message's mailing list per user-configurable settings, such as applying privacy checking (e.g., making sure that the sender is authorized to post to that list).

Now, as shown at step 609, the MLM creates a child process that will run the Injector; again, interprocess communication occurs through a "pipe." The MLM might invoke the Injector as follows:

mlm-inject -h /usr/local/Sendmail/MLM/etc/inject-hosts where the file /usr/local/Sendmail/MLM/etc/inject-hosts contains:

katroo.sendmail.com
medusa.blackops.org/2
charon.gothic.net
mail.concentric.net:2525
smtp.pacbell.net:2525/3

/usr/sbin/sendmail -bs -om -o MaxRecipients=0

As shown by step 611, the Injector arranges for distribution in such a way that every address will get handled by one of the MTAs. In other words, the Injector will never indicate to the MLM that an initial attempt failed. The approach here is that the MLM thinks that all the addresses worked, so that the MLM need not provide queuing. Via SMTP, the Injector hands the message to one or more MTAs, which will be responsible for distribution, as shown in step 612. One or more of those MTAs might be on the same machine (i.e., local), in which case the communication typically would occur through a "pipe"; otherwise, SMTP is used to communicate with a remote machine (over a TCP/IP network). At step 613, the method now iterates on step 605, in a manner similar to that done at step 606. However this time, the method is iteratively repeating step 605 for all of the recipients of the list, not just one. In effect, the MLM has taken the place of the client and is now sending the message out (to individual recipients). Ultimately for every given (valid) recipient, the message reaches its final destination. Each receiving MTA (i.e., receiving a message for one of the list recipients) carries out local delivery for its corresponding recipient's mailbox, as indicated at step 614.

B. Detailed Methodology of Injector Operation

Figure 7A:
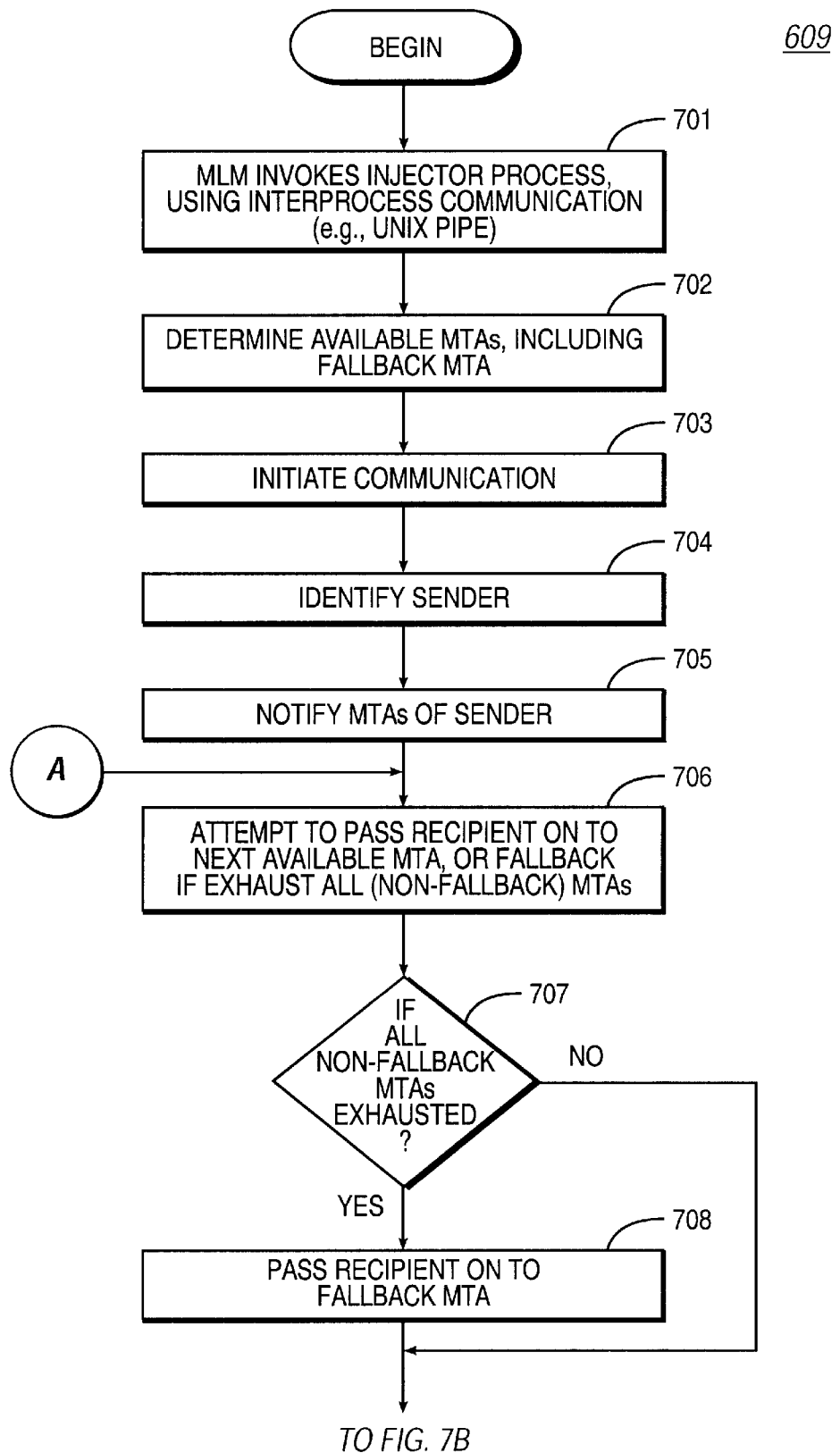
FIGS. 7A–B comprise a flowchart providing specific method steps for invoking the Injector component of the present invention.
Figure 7B:
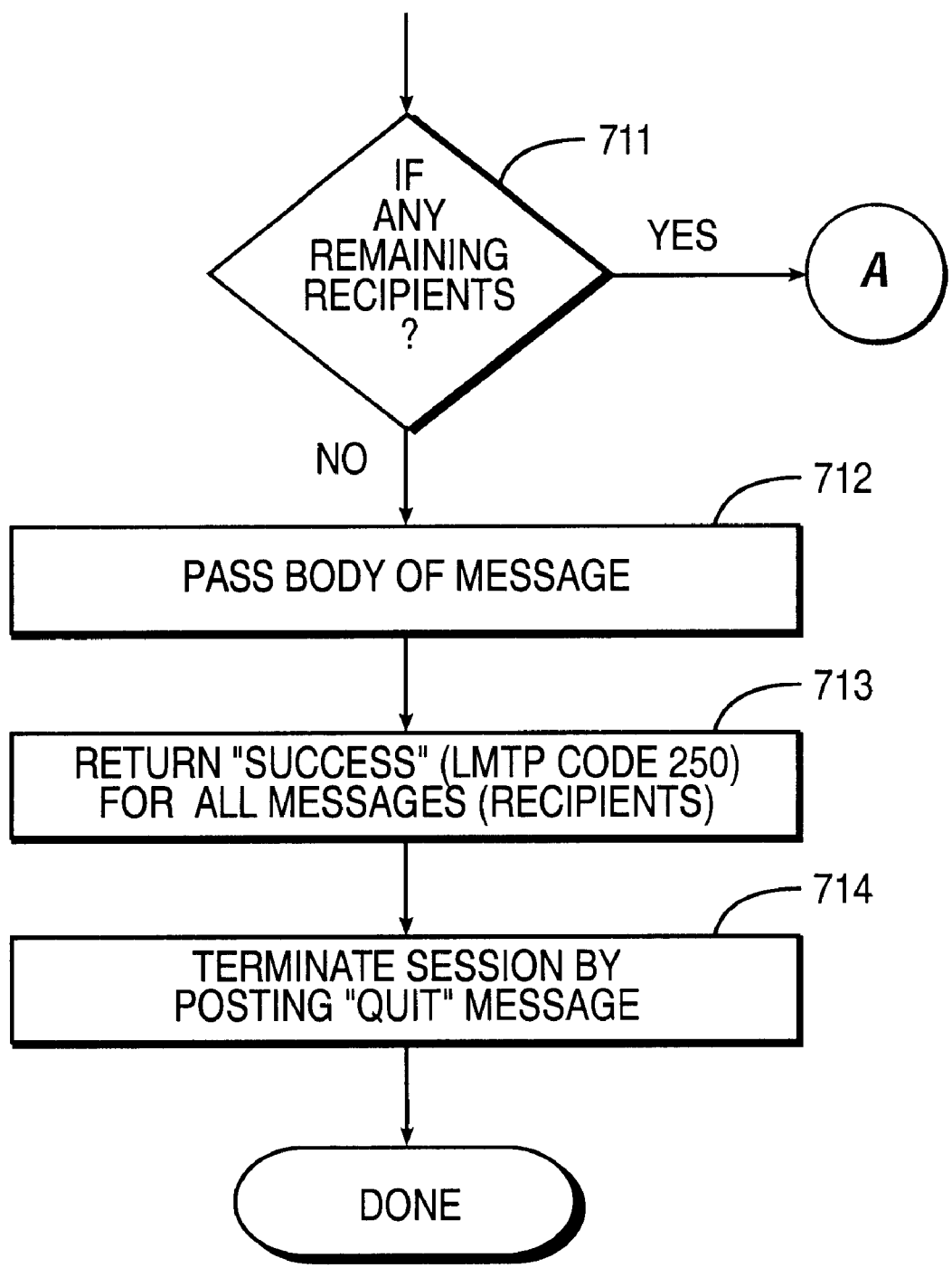

FIGS. 7A–B provide a detailed flowchart of the specific method steps that occur during invocation of the Injector. The corresponding session between the MLM and the Injector, using LMTP, that occurs at step 609 above, might appear as follows.

```
MLM: (establishes injector in a subprocess with a pipe)
INJ: 220 goober.example.com MLM LMTP ready
MLM: LHLO goober.example.com
INJ: 250-goober.example.com
INJ: 250-8BITMIME
INJ: 250-ENHANCEDSTATUSCODES
INJ: 250 PIPELINING
MLM: MAIL From:<gshapiro@gshapiro.net>
INJ: 250 2.5.0 ok
MLM: RCPT To:<msk@sendmail.com>
INJ: 250 2.1.5 ok
MLM: RCPT To:<rfreilich@scient.com>
INJ: 250 2.1.5 ok
MLM: RCPT To:<spacy@blackops.org>
INJ: 250 2.1.5 ok
MLM: RCPT To:<dangerjen@yahoo.com>
INJ: 250 2.1.5 ok
MLM: RCPT To:<garland@wellsfargo.com>
INJ: 250 2.1.5 ok
MLM: RCPT To:<weasel@gothic.net>
INJ: 250 2.1.5 ok
MLM: RCPT To:<mdkucher@netcom.ca>
INJ: 250 2.1.5 ok
MLM: RCPT To:<glaukopis@hotmail.com>
INJ: 250 2.1.5 ok
MLM: RCPT To:<shoo@houston.rr.com>
INJ: 250 2.1.5 ok
MLM: RCPT To:<mjr@blackened.com>
INJ: 250 2.1.5 ok
MLM: DATA
INJ: 354 go ahead
MLM: [message headers and body omitted for brevity]
MLM: .
INJ: 250 2.1.5 msk@sendmail.com OK
INJ: 250 2.1.5 rfreilich@scient.com OK
INJ: 250 2.1.5 spacy@blackops.org OK
INJ: 250 2.1.5 dangerjen@yahoo.com OK
INJ: 250 2.1.5 garland@wellsfargo.com OK
INJ: 250 2.1.5 weasel@gothic.net OK
INJ: 250 2.1.5 mdkucher@netcom.ca OK
INJ: 250 2.1.5 glaukopis@hotmail.com OK
INJ: 250 2.1.5 shoo@houston.rr.com OK
INJ: 250 2.1.5 mjr@blackened.com OK
MLM: QUIT
INJ: 221 2.0.0 bye
```

As indicated by step 701 and shown in the dialog above, the MLM establishes the Injector in a subprocess with a pipe, as previously described. The Injector, for its part, has started connections to all of the MTAs (including the fallback MTA) that it has been configured to communicate with (per a user-modifiable configuration file), as indicated by step 702. Initialization of the communication (protocol) between the MLM and the Injector occurs at step 703. Here, the Injector, having received a connection, presents a greeting or acknowledgment (LMTP code "220"). The MLM, in turn, acknowledges the greeting by responding "LHLO" (i.e., "hello"). After identifying itself, the MLM enumerates the features that it supports.

Now, the MLM is ready to communicate message information. Specifically, the MLM issues a "MAIL FROM" command and identifies the original sender (by address), as shown by step 704. The Injector, in turn, passes this information on to the corresponding MTA(s), as shown by step 705. The MLM now identifies the intended recipients sequentially, using a sequence of "RCPT TO" commands. Note that at this point, the message has been expanded to all of the recipients of the mailing list. The Injector attempts to pass each recipient on to one of the available MTAs, as indicated by step 706. If a particular MTA is not available or otherwise rejects the recipient, the Injector passes that recipient on to the next available MTA, until that recipient is either accepted or all (non-fallback) MTAs have been exhausted. If all non-fallback MTAs are exhausted (tested at step 707), the recipient is passed on to the fallback MTA, as indicated by step 708. If any recipients remain to be processed, tested at step 711, the method loops back to step 706. Otherwise, the method proceeds to step 712 where the MLM passes the body of the message to the Injector which, in turn, passes that on to all available MTAs. Note in particular that at the completion of step 712 all recipients have been successfully accepted by one of the MTAs. This guarantees that a "success" result is reported back to the MLM. In other words, every recipient address has been assigned to an MTA which will accept it. As shown by the sample dialog above, the Injector returns "success" (LMTP code "250") for all recipients, as indicated at step 713. Thereafter, the MLM hands the body of the message to the Injector, and may then terminate the session by posting a "QUIT" message, as shown by step 714.

Appended herewith as Appendix A is further description of the present invention, in the form of a functional specification and API (application programming interface) description for the Injector component of the present invention, the disclosure of which is hereby incorporated by reference.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

APPENDIX A:

Injector Functional Specification and API

Mailing List Manager Functional Specification
Injector

This section describes the standard injector program distributed with the MLM.

Description

As part of its input parameters, a set of one or more MTAs is identified. An MTA whose name begins with a backslash ("/") character is presumed to identify a program, and a pipe is established to a child process which executes that program. MTAs may also be weighted, so that more powerful MTAs can do more work than the less powerful ones.

Finally, a fallback MTA preferrably must be identified which is guaranteed to successfully accept any address. If only one MTA is specified, it is expected to also exhibit this property. If more than one MTA is specified, the fallback MTA is the last one in the list, and it will only receive addresses which are rejected by all other MTAs.

A reliable fallback MTA would be the Open Source Sendmail MTA, invoked with options that guarantee successful acceptance of an unlimited number of addresses.

The MLM passes a (potentially large) set of addresses to the injector. The injector distributes these to the specified MTAs using SMTP according to their weights (if any) and as otherwise described above. In the DATA phase of the protocol, the message headers and bodies are also passed to the MTAs. The MLM then closes its transaction with the injector, and the injector then closes its transactions with the MTAs.

MTAs that don't receive any addresses (e.g., 5 recipients, 9 MTAs) are shut down without receiving any addresses or submissions.

At this point, all MTAs have initially accepted all of the mail. Any rejections after this are handled by the MLM's DSN processing.

Invocation:

mim-inject [options] [host[:port][/weight]] . . .

where:

host identifies a hostname where an MTA exists which will relay e-mail items for this MLM; this can also begin with a backslash ("/") character, which indicates that this MTA is accessed via a pipe into a subprocess rather than using TCP/IP and SMTP port specifies a port where that MTA is listening, if different from the default SMTP port weight changes the weight of this host so that it receives more or less traffic than other hosts (defaults to 1; must be a positive integer)

Option Value Meaning

-h filename specifies a filename which contains host[:port] [/weight] entries, one-per-line, as described above; comments, i.e. lines beginning with a hash ("#") character, and blank lines, are allowed and ignored. If this option is not used, the MTAs must be identified as command-line parameters as depicted above.

-I facility defines the logging facility to be used by the injector. This can be an absolute filename if the injector should log manually, or (on UNIX) it can name a known syslog( ) facility.

The injector communicates with the enumerated MTAs using SMTP, as defined in RFC821. Once an MTA has accepted a given address, the injector returns a success message to the MLM so that it may proceed to the next address.

If an MTA returns an error on an address during an SMTP RCPT TO: command, the injector will attempt the same address in the next MTA in the list. Once all MTAs are attempted, the injector will pass the address to the fallback MTA. If that too fails, the injector closes down all MTA connections and returns a temporary failure to the MLM, encouraging it to try again later.

If an MTA returns a failure after the SMTP DATA phase, the injector should pass all of those addresses which were handed to that MTA on to the fallback MTA.

If an MTA returns a general failure, the injector should disregard it for this distribution but otherwise continue. If the fallback address fails, the injector returns a temporary failure to the MLM, encouraging it to try again later.

If the MLM encounters a resource or some other problem, the issue should be logged with a moderate level of severity (e.g. "notice", in terms of syslog( ) and return a temporary failure to the MLM.

Temporary failures are returned by causing the MLM to exit using the established Sendmail exit value EX_TEMPFAIL.

Notes

As shown in the example below, the injector does not need to make any attempt to do intelligent distribution. For example, you will see in the example that the gothic.net recipients don't always get sent to the gothic.net MTA directly, even though it is on the list of MTAs being used by this MLM. The goal here is to get the distribution process going, and making intelligent choices based on DNS MX records and pattern matching can slow that process greatly.

Example

The MLM might invoke the injector as follows:

mlm-inject -h /usr/local/Sendmail/MLM/etc/inject-hosts where the file /usr/local/Sendmail/MLM/etc/inject-hosts contains:

katroo.sendmail.com medusa.blackops.org/2 charon.gothic.net mail.concentric.net:2525 smtp.pacbell.net:2525/3

/usr/sbin/sendmail -bs -om -O MaxRecipients=0

The session between the MLM and the injector might look like this:

MLM: (establishes injector in a subprocess with a pipe)
INJ: 220 goober.example.com MLM LMTP ready
MLM: LHLO goober.example.com
INJ: 250-goober.example.com
INJ: 250-8BITMIME
INJ: 250-ENHANCEDSTATUSCODES
INJ: 250 PIPELINING
MLM: MAIL From:<gshapiro@gshapiro.net>
INJ: 250 2.5.0 ok
MLM: RCPT To:<msk@sendmail.com>
INJ: 250 2.1.5 ok
MLM: RCPT To:<rfreilich@scient.com>
INJ: 250 2.1.5 ok MLM: RCPT To:<spacy@blackops.org>
INJ: 250 2.1.5 ok
MLM: RCPT To:<dangerjen@yahoo.com>
INJ: 250 2.1.5 ok
MLM: RCPT To:<garland@wellsfargo.com>
INJ: 250 2.1.5 ok
MLM: RCPT To:<weasel@gothic.net>
INJ: 250 2.1.5 ok
MLM: RCPT To:<mdkucher@netcom.ca>
INJ: 250 2.1.5 ok
MLM: RCPT To: <glaukopis@hotmail.com>
INJ: 250 2.1.5 ok
MLM: RCPT To:<shoo@houston.rr.com>
INJ: 250 2.1.5 ok
MLM: RCPT To:<mjr@blackened.com>
INJ: 250 2.1.5 ok
MLM: DATA
INJ: 354 go ahead
MLM: [message headers and body omitted for brevity]
MLM: .
INJ: 250 2.1.5 msk@sendmail.com OK
INJ: 250 2.1.5 rfreilich@scient.com OK
INJ: 250 2.1.5 spacy@blackops.org OK
INJ: 250 2.1.5 dangerjen@yahoo.com OK
INJ: 250 2.1.5 garland@wellsfargo.com OK
INJ: 250 2.1.5 weasel@gothic.net OK
INJ: 250 2.1.5 mdkucher@netcom.ca OK
INJ: 250 2.1.5 glaukopis@hotmail.com OK
INJ: 250 2.1.5 shoo@houston.rr.com OK
INJ: 250 2.1.5 mjr@blackened.com OK
MLM: QUIT
INJ: 221 2.0.0 bye Behind the scenes, the injector has connected to each of the SMTP servers shown and distributed the addresses as per their weights. The injector only returns the 250 status code to the MLM once one of the MTAs has accepted the message as deliverable. The weighted distribution would be:

| Address | SMTP host |
|---|---|
| gshapiro@gshapiro.net | katroo.sendmail.com |
| msk@sendmail.com | medusa.blackops.org |
| rfreilich@scient.com | medusa.blackops.org |
| spacy@blackops.org | charon.gothic.net |
| dangerjen@yahoo.com | mail.concentric.net (port 2525) |
| garland@wellsfargo.com | smtp.pacbell.net (port 2525) |
| weasel@gothic.net | smtp.pacbell.net (port 2525) |
| mdkucher@netcom.ca | smtp.pacbell.net (port 2525) |
| glaukopis@hotmail.com | katroo.sendmail.com |
| shoo@houston.rr.com | medusa.blackops.org |
| mjr@blackened.com | medusa.blackops.org |

The fallback MTA is never used because all MTAs successfully accepted all addresses given to them.

Injector (API)

Synopsis

The injector API defines the expected behaviour of the injector program. The injector accepts an e-mail transaction from the MLM and hands it off to one or more MTAs for distribution.

The injector accepts LMTP on its standard input and returns the same protocol on its output. The MLM will wait for all addresses to be returned after the LMTP DATA phase. If all of them are successful, the MLM considers the distribution to have succeeded, cleans up and exits with a successful status so the calling MTA knows the operation succeeded. If any of the addresses was reported as a failure, the MLM will exit such that the calling MTA retries at a later date.

The injector should not do any partial deliveries. It should operate with the goal of delivering to either everybody or nobody.

Environment
    None.
Signal Handling
    Signals which are not ignored should be logged. The injector should then terminate with the MTA exit value EX_OSERR, a name defined in the Sendmail® open source product's source code.
Parameters and Options
    The MLM will invoke the injector using only its name and parameters as defined in the configuration file.
Input
    The injector accepts LMTP, as defined in RFC2033, on its standard input. Invalid input is handled as per the protocol specification.
Output
    The injector responds to its input with LMTP-compliant output.
Errors
    If the MTA rejects an address, this should be reflected in the LMTP response codes returned to the MLM.
    Any internal or other errors should also be appropriately relayed to the MLM.
Return Status
    The injector should always return 0 unless it terminates because of a signal or other serious unanticipated failure. Otherwise, return status is delivered to the MLM at the termination of the LMTP interaction.
Example
    The session between the MLM and the injector might look like this:
    MLM: (establishes injector in a subprocess with a pipe)
    INJ: 220 goober.example.com MLM LMTP ready
    MLM: LHLO goober.example.com
    INJ: 250-goober.example.com
    INJ: 250-8BITMIME
    INJ: 250-ENHANCEDSTATUSCODES
    INJ: 250 PIPELINING
    MLM: MAIL From: <gshapiro@gshapiro net>
    INJ: 250 2.5.0 ok
    MLM: RCPT To:<msk@sendmail.com>
    INJ: 250 2.1.5 ok
    MLM: RCPT To:<rfreilich@scient.com>
    INJ: 250 2.1.5 ok
    MLM: RCPT To:<spacy@blackops.org>
    INJ: 250 2.1.5 ok
    MLM: RCPT To:<dangerjen@yahoo.com>
    INJ: 250 2.1.5 ok
    MLM: RCPT To: <garland@wellsfargo.com>
    INJ: 250 2.1.5 ok
    MLM: RCPT To:<weasel@gothic.net>
    INJ: 250 2.1.5 ok
    MLM: RCPT To:<mdkucher@netcom.ca>
    INJ: 250 2.1.5 ok MLM: RCPT To:<glaukopis@hotmail.com>
INJ: 250 2.1.5 ok
MLM: RCPT To:<shoo@houston.rr.com>
INJ: 250 2.1.5 ok
MLM: RCPT To:<mjr@blackened.com>
INJ: 250 2.1.5 ok
MLM: DATA
INJ: 354 go ahead
MLM: [message headers and body omitted for brevity]
MLM: .
INJ: 250 2.1.5 msk@sendmail.com OK
INJ: 250 2.1.5 rfreilich@scient.com OK
INJ: 250 2.1.5 spacy@blackops.org OK
INJ: 250 2.1.5 dangerjen@yahoo.com OK
INJ: 250 2.1.5 garland@wellsfargo.com OK
INJ: 250 2.1.5 weasel@gothic.net OK
INJ: 250 2.1.5 mdkucher@netcom.ca OK
INJ: 250 2.1.5 glaukopis@hotmail.com OK
INJ: 250 2.1.5 shoo@houston.rr.com OK
INJ: 250 2.1.5 mjr@blackened.com OK
MLM: QUIT
INJ: 221 2.0.0 bye

What is claimed is:

1. In an electronic mail (e-mail) system, a method for processing a predefined mailing list used for specifying distribution of an e-mail message to multiple recipients, the method comprising:

receiving at the system an e-mail message specifying delivery to a predefined mailing list that specifies e-mail addresses for a plurality of recipients, the e-mail message specifying message content for the e-mail in a message body;

passing the e-mail message to a mailing list manager for processing the mailing list, said mailing list manager in communication with a plurality of message transfer agents available for processing e-mail addresses and in communication with a fallback message transfer agent for processing e-mail addresses that have been rejected by all of the other available message transfer agents;

for each given recipient of the mailing list,
    passing the given recipient's e-mail address to successive ones of the available message transfer agents until that recipient's e-mail address has been successfully processed or all of the other available message transfer agents have been exhausted, and
    in the event that the given recipient's e-mail address cannot he successfully processed by one of said plurality of available message transfer agents, passing the given recipient's e-mail address to the fallback message transfer agent for processing; and handing off the message body for the e-mail message only after all of the addresses of the recipients have been assigned to message transfer agents.

2. The method of claim 1, further comprising:
first creating the e-mail message at a mail user agent.

3. The method of claim 2, wherein said receiving step includes:
establishing an SMTP (Simple Mail Transport Protocol) session between the mail user agent and the system, so that the e-mail message may be submitted to a first mail transfer agent of the system.

4. The method of claim 1, further comprising:
before passing a given recipient's e-mail address to successive ones of the mail transfer agents, attempting to establish a connection with a plurality of mail transfer agents for determining which ones are available.

5. The method of claim 1, wherein at least some of the mail transfer agents reside on different computers than that used for said mailing list manager.

6. The method of claim 1, wherein said mailing list manager and said fallback message transfer agent reside on a single computer.

7. The method of claim 1, wherein said mailing list manager includes an injector component that controls said fallback message transfer agent via interprocess communication.

8. The method of claim 7, wherein said interprocess communication comprises a UNIX pipe.

9. The method of claim 1, wherein said mailing list manager first verifies the received e-mail message before attempting to pass it on to a message transfer agent.

10. The method of claim 1, wherein said mailing list manager includes an injector component responsible for passing recipient addresses from the mailing list manager to the available message transfer agents, or to the fallback message transfer agent for those recipient addresses where the available message transfer agents are unsuccessful.

11. The method of claim 10, wherein said injector component always indicates to the mailing list manager that each initial attempt to deliver to an intended recipient is successful.

12. The method of claim 11, wherein said injector component assumes responsibility for queuing delivery for any recipient's address passed to it.

13. The method of claim 11, further comprising:
creating a bounce message at the injector component, in the event that a particular recipient's address passed to the fallback message transfer agent ultimately cannot be successfully processed.

14. The method of claim 1, wherein processing of the recipients' addresses of the mailing list are divided among the message transfer agents, based on the specific number of message transfer agents determined to be available.

15. The method of claim 14, wherein the system determines the specific number of message transfer agents available based on those message transfer agents which can successfully establish a connection.

16. In an electronic mail (e-mail) system, a method for processing an e-mail message sent to a mailing list, the method comprising:

receiving by the system an e-mail message created at a client that is being sent to a predefined mailing list, said predefined mailing list comprising e-mail addresses for a plurality of recipients, the e-mail message specifying message content for the e-mail in a message body;

routing the e-mail message to a message transfer agent that is intended to handle mail for the client;

invoking, by the message transfer agent, a mailing list manager for processing the mailing list; and invoking, by the mailing list manager, an injector module for injecting the e-mail addresses for the plurality of recipients into multiple message transfer agents that can successfully carry out delivery, said multiple message transfer agents including a fallback message transfer agent that is employed when no other message transfer agent can successfully carry out delivery, wherein all of the e-mail addresses for the plurality of recipients are processed without reporting an error to the mailing list manager, and wherein the message body for the e-mail message is handed off for processing only after all of tile addresses of the recipients have been assigned to message transfer agents.

17. The method of claim 16, wherein the e-mail message created at the client is communicated to the system via SMTP (Simple Mail Transport Protocol).

18. The method of claim 16, wherein the mailing list manager communicates with the injector module via LMTP (Local Mail Transfer Protocol).

19. The method of claim 16, wherein the injector module communicates with the multiple message transfer agents via SMTP (Simple Mail Transport Protocol).

20. The method of claim 16, wherein the e-mail message created at the client is first received by a nearest message transfer agent, before the e-mail message is passed on to the message transfer agent that is intended to handle mail for the client.

21. The method of claim 16, wherein the client includes mail user agent software for composing an e-mail message.

22. The method of claim 21, wherein said receiving step includes:
    establishing an SMTP (Simple Mail Transport Protocol) session between the mail user agent software and the system, so that the e-mail message may be submitted to a first mail transfer agent.

23. The method of claim 16, wherein the injector module initially distributes processing of the recipients' addresses among all available message transfer agents, other than the fallback message transfer agent.

24. The method of claim 16, wherein the fallback message transfer agent is employed for a given recipient's address only if no other message transfer agent can successfully process that recipient's address.

25. The method of claim 16, wherein at least some of the mail transfer agents reside on different computers than that used for said mailing list manager.

26. The method of claim 16, wherein said mailing list manager and said fallback message transfer agent reside on a single computer.

27. The method of claim 16, wherein said mailing list manager and said injector module communicate via interprocess communication.

28. The method of claim 27, wherein said interprocess communication comprises a UNIX pipe.

29. The method of claim 16, wherein said mailing list manager first verifies the received e-mail message before attempting to pass it on for processing.

30. The method of claim 16, wherein said injector module assumes responsibility for queuing delivery for any recipient's address passed to it.

31. An electronic mail (e-mail) system comprising:
    an e-mail client for creating an e-mail message specifying delivery to a predefined mailing list that specifies e-mail addresses for a plurality of recipients, the e-mail message specifying message content for the e-mail in a message body;
    a mailing list manager for processing said mailing list;
    a plurality of available message transfer agents that are online and potentially available for processing e-mail addresses;
    a fallback message transfer agent for processing e-mail addresses that have been rejected by all of the other available message transfer agents; and
    an injector module that passes each given recipient's e-mail address from the mailing list manager to successive ones of the available message transfer agents until that recipient's e-mail address has been successfully processed, or otherwise passes the given recipient's e-mail address to the fallback message transfer agent for processing when the given recipient's e-mail address cannot be successfully processed by one of the available message transfer agents, wherein the message body for the e-mail message is handed off for processing only after the address of each recipient has been assigned to one of the message transfer agents.

32. The system of claim 31, wherein said injector module always indicates to the mailing list manager initial success for processing a given recipient's e-mail address.

33. The system of claim 31, wherein said e-mail client includes mail user agent software.

34. The system of claim 31, wherein the e-mail message created at the client is first communicated to a nearest message transfer agent of the system via SMTP (Simple Mail Transport Protocol).

35. The system of claim 31, wherein the mailing list manager communicates with the injector module via LMTP (Local Mail Transfer Protocol).

36. The system of claim 31, wherein the injector module communicates with the multiple message transfer agents via SMTP (Simple Mail Transport Protocol).

* * * * *